United States Patent [19]

Otsuki et al.

[11] Patent Number: 4,611,859

[45] Date of Patent: Sep. 16, 1986

[54] ANTI-SKID BRAKING APPARATUS FOR VEHICLES

[75] Inventors: Hiromi Otsuki; Ryoichi Matsuura; Shinichi Hori; Hiroshi Fujinami, all of Anjo; Hiroyuki Oka, Susono; Yoshihisa Nomura, Toyota, all of Japan

[73] Assignees: Nippondenso Co., Ltd., Kariya; Toyota Jidosha Kabushiki Kaisha, Toyota, both of Japan

[21] Appl. No.: 721,392

[22] Filed: Apr. 9, 1985

[30] Foreign Application Priority Data

Apr. 9, 1984 [JP] Japan .................................. 59-70623

[51] Int. Cl.⁴ ............................................... B60T 8/58
[52] U.S. Cl. .................................... 303/100; 303/116; 303/119
[58] Field of Search ...................... 303/61, 100, 10, 92, 303/91, 95, 96, 94, 103, 105, 106, 119, 116, 113; 188/353, 181 R, 181 A

[56] References Cited

U.S. PATENT DOCUMENTS 3,645,352 2/1972 Stark et al. ............................ 303/95
3,847,449 11/1974 Adahan ................................ 303/116
3,852,613 12/1974 Wienecke .............................. 303/92
3,948,568 4/1976 Leiber .................................. 303/92
4,395,073 7/1983 Arikawa et al. ..................... 303/116
4,421,361 12/1983 Avikawa et al. ..................... 303/92

FOREIGN PATENT DOCUMENTS

0142733 11/1981 Japan .

Primary Examiner—Bruce H. Stoner, Jr.
Assistant Examiner—Alvin Oberley
Attorney, Agent, or Firm—Cushman, Darby & Cushman

[57] ABSTRACT

In an anti-skid braking apparatus for vehicles of the type having a fluid-pressure control valve arranged between a master cylinder and a wheel cylinder for controlling the brake fluid pressure within the wheel cylinder, when it is detected that the vehicle stops, the fluid-pressure control valve is controlled so as to assume a pressure-maintaining mode and a pressure-increasing mode alternately for a predetermined period of time as long as the brake pedal is continuously depressed. As a result, the pressure of the fluid increases stepwise preventing the occurrence of uncomfortable kickback at the brake pedal.

11 Claims, 5 Drawing Figures

ANTI-SKID BRAKING APPARATUS FOR VEHICLES

BACKGROUND OF THE INVENTION

RELATED APPLICATIONS

This application is related to co-pending commonly assigned or partially commonly assigned, application of Otsuki et al, Ser. No. 662,630, filed Oct. 19, 1984, application of Otsuki et al, Ser. No. 667,221, filed Nov. 22 1984, and application of Tsuru et al, Ser. No. unknown, filed Mar. 22, 1985 (corresponding Japanese application No. 59-57130).

This invention relates generally to hydraulic braking apparatus for vehicles of the kind using a pedal-operated master cylinder controlling a supply of hydraulic fluid under pressure to wheel brakes, and more particularly to such a hydraulic braking apparatus with an electronic control unit which is capable of preventing kickback of the brake pedal.

The pressure of the braking fluid in a hydraulic braking apparatus for vehicles has to be optimally controlled in receipt of instructions from a control unit so that effective and safe braking is performed for decelerating a vehicle irrespective of the state of the road surface. To this end various anti-skid braking apparatus or anti-skid control devices have hitherto been proposed. According to conventional anti-skid braking apparatus, when a fluid-pressure control valve disposed between a master cylinder and a wheel cylinder of the braking system is put in pressure-decreasing mode in accordance with an instruction from a control unit, the brake fluid is led from the wheel cylinder to a reservoir and the fluid is further fed back to a fluid supply conduit of the master cylinder by way of a pressurizing pump.

In such conventional anti-skid braking apparatus, when the vehicle is stopped during the condition where the brake fluid is stored in the reservoir after the pressure control of the fluid is started, the brake fluid stored in the reservoir at the time of end of the pressure control, is further pressurized by the fluid-pressurizing pump to be returned to the master cylinder since the fluid-pressure control valve has been put in pressure-increasing mode in receipt of an instruction signal from the control unit. As a result, the pressurized fluid in the master cylinder pushes back, via the piston of the master cylinder, the brake pedal, producing so called kickback which gives uncomfortable feeling to the foot of the vehicle driver.

In order to solve this problem, a technique of preventing the brake fluid from flowing into the master cylinder when vehicle is stopped, by providing an accumulator at the outlet of the fluid-pressurizing pump and a check valve in the fluid supply conduit was proposed. This technique is used in an anti-skid control apparatus disclosed in a Japanese patent provisional publication No. 56-142733. However, in this known anti-skid control apparatus, fluid pressure still remains in the wheel cylinder due to cracking pressure of the check valve at the time of releasing the brake.

SUMMARY OF THE INVENTION

The present invention has been developed in order to remove the above-described drawbacks inherent to the conventional anti-skid braking apparatus.

It is, therefore, an object of the present invention to provide a new and useful anti-skid braking apparatus for vehicles so that uncomfortable kickback of the brake pedal is prevented without requiring the change in fluid conduits.

According to a feature of the present invention after the vehicle is stopped, the fluid-pressure control valve arranged between the master cylinder and a wheel cylinder is controlled such that it is put in fluid-increasing mode intermittently for a predetermined period of time. As a result, the pressure of the fluid in the master cylinder is prevented from rapidly increasing after the vehicle is stopped.

In accordance with the present invention there is provided an anti-skid braking appartus for a vehicle, comprising: a fluid-pressure control valve arranged between a master cylinder and a wheel cylinder for automatically controlling the pressure of fluid in the wheel cylinder in accordance with a control signal; a reservoir communicating with the fluid-pressure control valve for dicharging fluid in the wheel cylinder via the fluid-pressure control valve when the fluid-pressure control valve is in a pressure-decreasing mode; a fluid-pressurizing pump communicating with the reservoir for feeding the fluid in the reservoir to a conduit communicating with the master cylinder and the fluid-pressure control valve; a wheel speed detector for detecting the rotational speed of a wheel of the vehicle; and a control unit responsive to an output signal from the wheel speed detector for producing the control signal fed to the fluid-pressure control valve for performing anti-skid braking, the control unit having first means for detecting when the vehicle is stopping, and second means for causing the fluid-pressure control valve to assume a pressure-increasing mode intermittently after the vehicle stops.

In accordance with the present invention there is also provided an anti-skid braking apparatus for a vehicle, of the type arranged to control a fluid-pressure control valve provided between a master cylinder and a wheel cylinder for assuming pressure-decreasing mode, pressure maintaining mode and pressure-increasing mode in accordance with a control signal produced on the basis of wheel speed data, the anti-skid braking apparatus comprising: first means for detecting whether the vehicle is moving or not; and second means for producing an additional control signal, after the vehicle stops, for causing the fluid-pressure control valve to assume the pressure-increasing mode intermittently.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
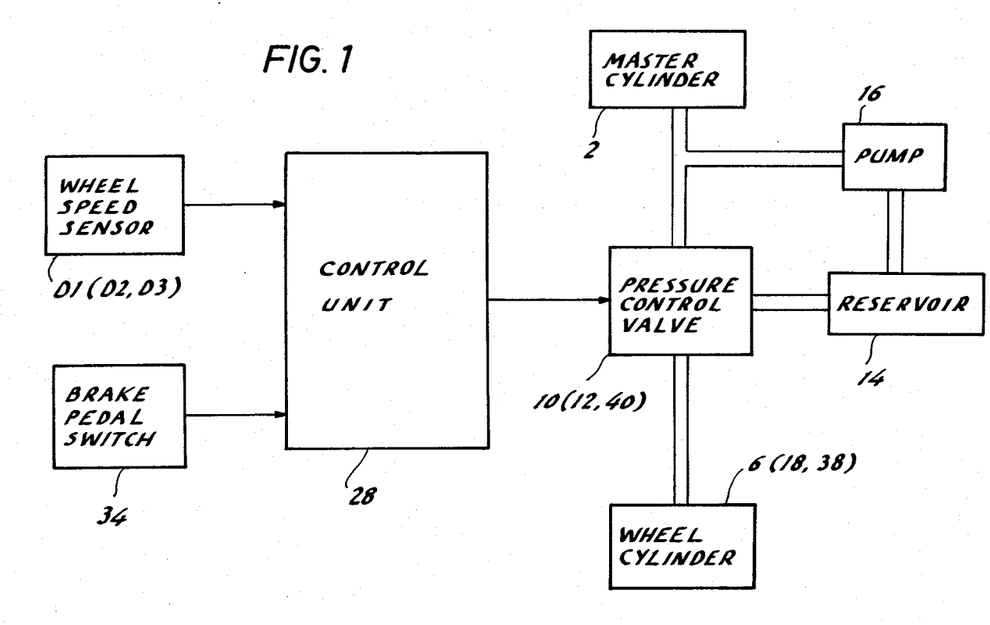
FIG. 1 is a schematic view showing a principle of the present invention.

FIG. 1 shows a schematic view illustrating the principle of the present invention. A wheel speed sensor D1 (D2, D3) is provided for detecting the rotational speed of a vehicle wheel. In the case of normal passenger motor vehicle with four wheels, two wheel speed sensors D1 and D2 are provided for respectively detecting the rotational speed of the front wheels, and another wheel speed sensor D3 is also provided for detecting the rotational speed of the rear wheels. A brake pedal switch 34 is associated with a brake pedal for detecting its depressed state. An electromagnetic fluid-pressure control valve 10 (12, 40) is provided between a master cylinder 2 and a wheel cylinder 6 (8, 38) of the braking system, and this fluid-pressure control valve communicates with a fluid reservoir 14 so as to decrease the fluid pressure when necessary. A fluid pressurizing pump 16 is provided for pressurizing the fluid from the reservoir 14 to send the same to a conduit communicating the master cylinder 2. An electronic control unit 28 is provided for controlling the fluid-pressure control valve 10 (12, 40) in receipt of output signals from the vehicle speed sensors D1 (D2, D3) and the brake pedal sensor 34.

Figure 2:
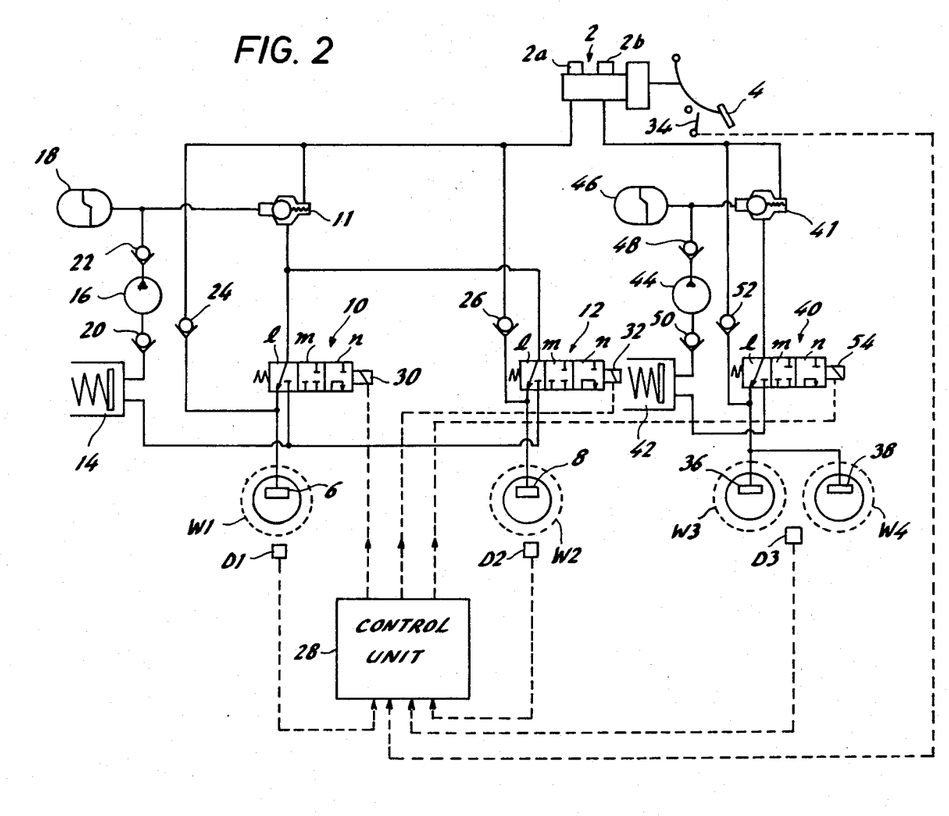
FIG. 2 is a schematic diagram showing an embodiment of the anti-skid braking system according to the present invention.

Reference is now made to FIG. 2 showing an embodiment of the anti-skid braking apparatus according to the present invention. In FIG. 2, conduits in hydraulic braking apparatus are shown by solid lines while electrical connections are shown by dotted lines. The master cylinder 2 of tandem type is shown to be associated with a brake pedal 4 of an unshown motor vehicle. The master cylinder 2 communicates via conduits with wheel cylinders 6 and 8 of front wheels W1 and W2, where fluid-pressure control valves 10 and 12 and a passage-switching valve 11 are connected to the conduits. The master cylinder 2 is equipped with reservoirs 2a and 2b. Each of the fluid-pressure control valves 10 and 12 has first through third ports. The first port communicates via the passage-switching valve 11 with the master cylinder 2, while the second port communicates with the wheel cylinder 6 or 8. The third port communicates with the fluid reservoir 14 so that brake fluid discharged from the wheel cylinders 6 and 8 is stored therein with the fluid being fed via the fluid-pressure control valves 10 and 12. The fluid-pressurizing pump 16 communicates with the reservoir 14 so as to pressurize the fluid therefrom and an accumulator 18 is provided to an oulet side of the pump 16. Check valves 20 and 22 for preventing reverse flow are respectively provided at inlet and outlet of the pump 16. A conduit connected between the accumulator 18 and the check valve 22 communicates with the passage-switching valve 11. Further check valves 24 and 26 are provided to conduits between the master cylinder 2 and the wheel cylinders 6 and 8 so that the check valves 24 and 26 are parallel to the combination of the passage-switching valve 11 and the fluid-pressure control valves 10 and 12.

Wheel speed sensors D1 and D2 are respectively provided to the front wheels W1 and W2, while another speed sensor D3 is provided to either of rear wheels W3 and W4. Each of the wheel speed sensors D1 to D3 has a pulse generator which generates a pulse train having a frequency proportional to the rotational speed of the associated wheel, and this pulse train is fed to the electronic control unit 28 in which various control circuits are built. The brake pedal switch 34 is shown to be associated with the brake pedal 4 for detecting the depressed state of the brake pedal 4 and sending an output signal indicative of the pedal depression to the control unit 28.

The control unit 28 receives these signals from the wheel speed sensors D1 through D3 and from the brake pedal switch 34 for effecting anti-skid control which per se is known and an additional control for preventing kickback of the brake pedal which is apt to occur after the vehicle is stopped. To this end, the control unit 28 executes various processings as will be described hereinlater so as to produce control signals which are fed to the fluid-pressure control valves 10 and 12 for energizing and deenergizing solenoids 30 and 32 thereof.

Each of the fluid-pressure control valves 10 and 12 is a 3-port, 3-position electromagnetic valve which is controllable by changing excitation current fed to the solenoid thereof. More specifically, an excitation current fed from the control unit 28 as a control signal or a drive current is arranged to assume one of three values or levels. These three levels are referred to as a first level, a second level and a zero level in the order of current value. When the drive current, which is referred to as a SOL signal or indicated at SOL hereinafter, from the control unit 28 assumes the zero level, the fluid-pressure control valves 10 and 12 are switched to a position "l" corresponding to pressure-increasing mode in which brake fluid fed from the master cylinder to the first port thereof is supplied to the wheel cylinders 6 and 8 respectively. This state is established even after the vehicle is stopped. In the case that the drive current from the control unit 28 assumes the first level, the fluid-pressure control valves 10 and 12 are switched to a position "n" corresponding to pressure-decreasing mode in which brake fluid within the wheel cylinders 6 and 8 is discharged via the fluid-pressure control valves 10 and 12 to the reservoir 14. In the case that the drive current SOL from the control unit 28 assumes the second level, the fluid-pressure control valves 10 and 12 are switched to a position "m" corresponding to pressure-maintaining mode in which brake fluid pressure within the wheel cylinders 6 and 8 is kept constant.

Another fluid-pressure control valve 40 similar to the above-mentioned control valves 10 and 12 is provided for controlling fluid pressure of the brakes of the rear wheels W3 and W4. A passage-switching valve 41, a reservoir 42, an accumulator 46, fluid-pressurizing pump 44, check valves 48 and 50 all similar to those for the front wheels W1 and W2 are provided in the same manner as in the hydraulic system for the front wheels. The hydraulic system for the rear wheels W3 and W4 is different from that of the front wheels in that both the rear wheels W3 and W4 are controlled simultaneously by the single fluid-pressure control valve 40. The fluid-pressure control valve 40 has a solenoid 54 responsive to an excitation or drive current fed from the control unit 28 as a control signal so that it assumes one of pressure-increasing mode (position l), pressure-decreasing mode (position n) and pressure-maintaining mode (position m) in the same manner as the fluid-pressure control valves 10 and 12.

As the above-mentioned three fluid-pressure control valves 10, 12 and 40 are respectively controlled by three different drive currents SOL from the control unit 28 so as to perform anti-skid control in a known manner, and these control valves 10, 12 and 40 are simultaneously controlled by identical drive currents SOL from the control unit 28 after the vehicle stops so as to provide the aforementioned additional control of brake fluid pressure for preventing kickback.

Figure 3:
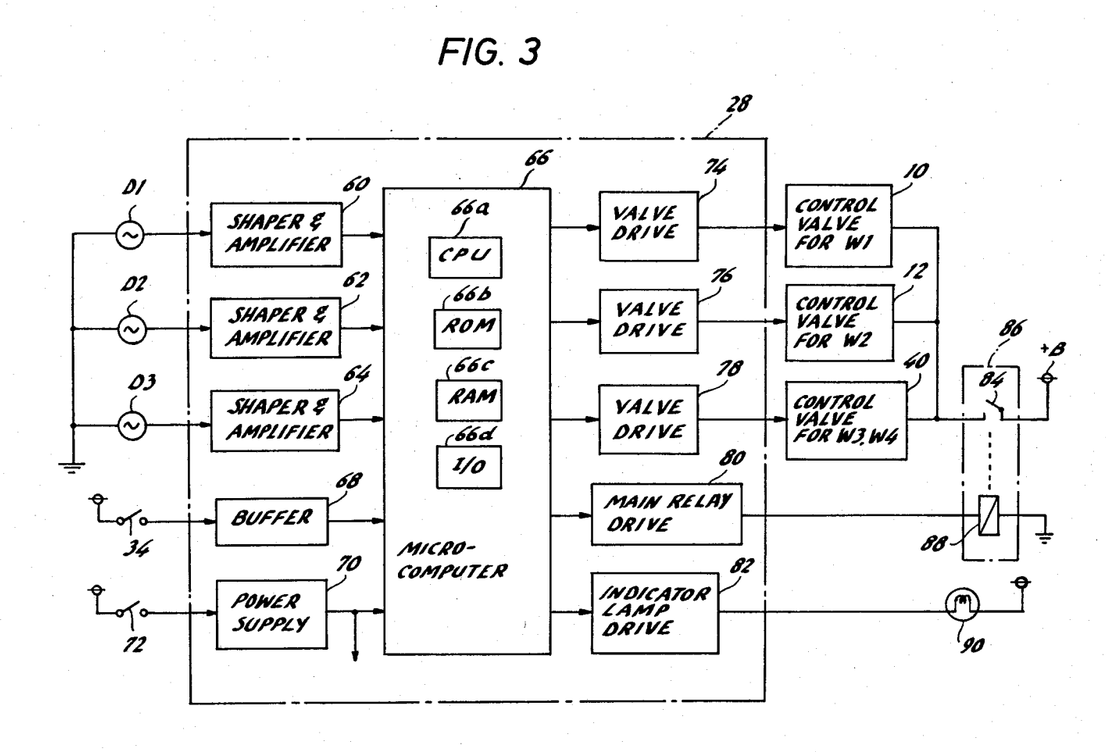
FIG. 3 is a schematic diagram of an electronic control unit shown in FIG. 2.

Referring now to FIG. 3, a schematic block diagram of the control unit 28 shown in FIG. 1 is illustrated. The control unit 28 comprises waveform shaping and amplifying circuits 60, 62 and 64 respectively responsive to output signals from the wheel speed sensors D1, D2 and D3 so that the output signals are shaped to be pulse signals suitable for processing by a microcomputer 66 which is a main part of the control unit 28. The microcomputer 66 comprises a central processing unit (CPU) 66a, a read-only memory (ROM) 66b, a random-access memory (RAM) 66c, and an input/output device (I/O) 66d. The CPU 66a is arranged to operate a program prestored in the ROM 66b as will be described hereinlater so as to perform anti-skid control and the additional control for preventing kickback of the brake pedal 4.

A buffer circuit 68 is responsive to an output signal from the brake pedal switch 34 for receiving and sending the same to the microcomputer 66. A power supply 70 is arranged to receive electrical power via an ignition switch 72 of a motor vehicle from a vehicle-mounted battery (not shown) so as to supply a regulated voltage to the microcomputer 66 and other circuits. Fluid-pressure control valve drive circuits 74, 75 and 76 are provided for driving the fluid-pressure control valves 10, 12 and 40 in accordance with instructions or control signals from the microcomputer 66. In detail, the drive circuit 74 is arranged to drive the fluid-pressure control valve 10 which is provided for the front-left wheel W1, and the drive circuit 76 is arranged to drive the fluid-pressure control valve 12 provided for the front-right wheel W2. Similarly, the drive circuit 78 is arranged to drive the fluid-pressure control valve 40 provided for the rear wheels W3 and W4.

A main relay drive circuit 80 is provided for energizing, in response to an output signal from the microcomputer 66, a coil 88 of a main relay 86 having normally open contacts 84 one of which is connected to a power source +B. When the coil 88 of the main relay 86 is energized, the normally open contacts 84 are closed for connecting one end of the solenoids 30, 32 and 54 of the fluid-pressure control valves 10, 12 and 40 to the power source +B. An indicator drive circuit 82 is provided to energize an indicator lamp 90 in response to a signal from the microcomputer 66 for indicating that the anti-skid braking apparatus is operating. In detail, the indicator lamp 90 is energized during normal anti-skid control and the additional control according to the present invention following the anti-skid control.

The anti-skid braking apparatus according to the present invention operates as follows. When the ignition switch 72 is turned on to start an unshown engine of the vehicle, a regulated voltage is fed from the power supply 70 to the microcomputer 66 and other circuits. Thus the CPU 66a of the microcomputer 66 starts executing various computations and operations in accordance with a predetermined program stored in the ROM 66b. The contents of this program is shown by way of a flowchart of FIG. 4.

Figure 4:
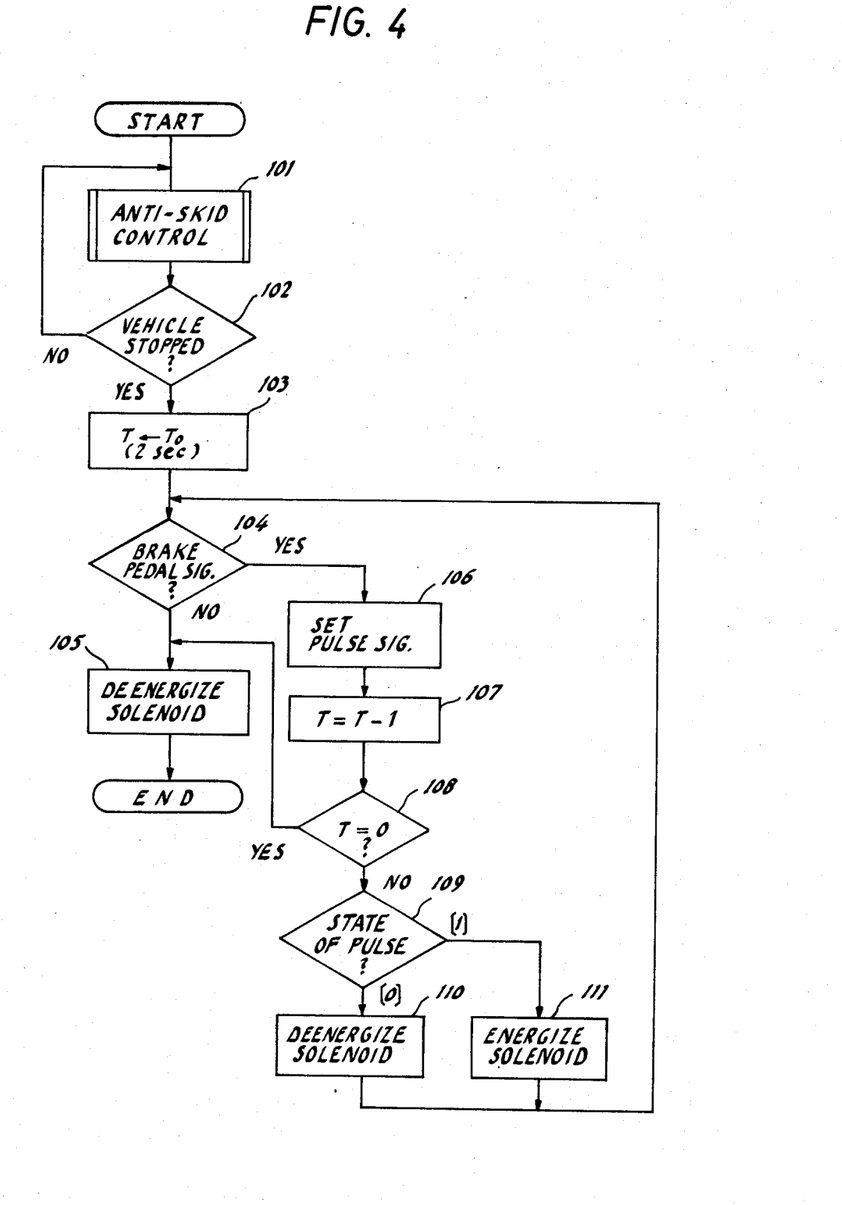
FIG. 4 is a flowchart showing the operation of a mirocomputer used in the electronic control unit of FIG. 3.

When the ignition switch 72 is turned on, the execution of the routine shown in the flowchart of FIG. 4 is started, and at the beginning, necessary initialization (not shown) is performed. Anti-skid control, which per se is known in the art, is performed when the brake pedal 4 is depressed for braking in a step 101. This anti-skid control may be performed in accordance with a program which may be produced using conventional anti-skid control techniques such as disclosed in U.S. Pat. No. 3,948,568.

In a step 102, it is determined whether the vehicle is stopped or not. To this end, the moving speed of the vehicle is detected. In a preferred embodiment, however, the vehicle speed is not directly detected but is estimated or approximated through calculation using wheel speed data which is derived from one or more of the wheel speed sensors D1 to D3. Until the determination of the step 102 results in YES, the step 101 is repeatedly executed so that the anti-skid control is executed until the vehicle stops. As a result, the pressure of the brake fluid within the wheel cylinders 6, 8 and 38 is automatically adjusted so as to be increased, decreased or maintained thereby effective and safe braking is performed to completely stop the vehicle. When the vehicle stops, a step 103 is executed for presetting an initial value To in a down counter, which is a software counter. This initial value To represents a time duration such as 2 seconds or so to measure the laps of time, and is set as a variable or count T which decreases as time goes. This time duration of 2 seconds or so gives a maximum period for effecting the additional control of fluid pressure after the vehicle stops as will be understood from the following description.

In a following step 104, it is checked whether the output signal from the brake pedal switch 34 is present or not. If the brake pedal 4 is continuously depressed even after the vehicle has stopped, the determination in the step 104 results in YES. Then a step 106 is executed for setting a given duty cycle of on/off operation. More specifically, a pulse train signal assuming logic "1" and "0" alternately is set by way of a software counter or timer where the period and width of the pulse are predetermined to provide the given duty cycle. The logic state of the pulse signal is represented by a flag so as to be detected for producing control signals fed to the fluid-pressure control valve drive circuits 74 to 78 as will be described hereinlater. The logic "1" and "0" states of the pulse signal respectively indicate instructions that level of the drive currents SOL fed to the fluid-pressure control valves 10, 12 and 40 is changed between the second level and the zero level. Accordingly, the solenoids 30, 32 and 54 of the fluid-pressure control valves 10, 12, and 40 are arranged to be energized and deenergized respectively in accordance with the logic state of the pulse signal set in the step 106.

After the execution of the step 106, a step 107 is carried out for subtracting 1 from the variable T for down counting the count of the software down counter. In a following step 108, it is checked whether the variable T or the count of the down counter equals 0 or not for detecting if the predetermined period time, which is 2 seconds in this embodiment, has lapsed. When the determination in the step 108 is NO, a step 109 is executed for detecting whether the pulse signal set in the step 106 assumes the second level, i.e. logic "1", or the zero level, i.e. logic "0" by detecting the above-mentioned flag. When logic "0" is detected, a step 110 is executed to turn off or deenergize the solenoids 30, 32 and 54 of the fluid-pressure control valves 10, 12 and 40 so that pressure-increasing mode is established. On the contrary, when logic "1" is detected, a step 111 is executed to turn on or energize the solenoids 30, 32 and 54 so that pressure-maintaining mode is established. After either of the steps 110 and 111 is completed, the operational flow returns to the step 104 for detecting if the brake pedal switch 32 is still in on state. In this way, steps 106 through 109 and one of the steps 110 and 111 are repeatedly executed so that the solenoids 30, 32, and 54 of the fluid-pressure control valves 10, 12 and 40 are alternately deenergized and energized to be put in pressure-increasing mode and pressure-maintaining mode in accordance with the pulse signal set in the step 106. Since this pulse signal has a predetermined period and width to provide a given duty cycle, the solenoids 30, 32 and 54 are on/off controlled in accordance with the given duty cycle.

During the above-mentioned control through repetitive computation, when the variable T reaches the initial value To, namely when 2 seconds have passed, the determination in the step 108 becomes YES. As a result, a step 105 is executed to continuously deenergize the solenoides 30, 32 and 54, and the operation of this routine is terminated.

Although it has been assumed that the brake pedal 4 has been continuously depressed for two seconds or more after the vehicle stopped in the above description, let us suppose that the brake pedal 4 is released during the control of the above-mentioned repetitive computation, i.e. steps 106 et seq. When the brake pedal 4 is released, the brake pedal switch 32 associated therewith is turned off. As a result, the determination in the step 104 becomes NO causing the operational flow to go to the step 105 in which the solenoids 30, 32 and 54 are deenergized.

Figure 5:
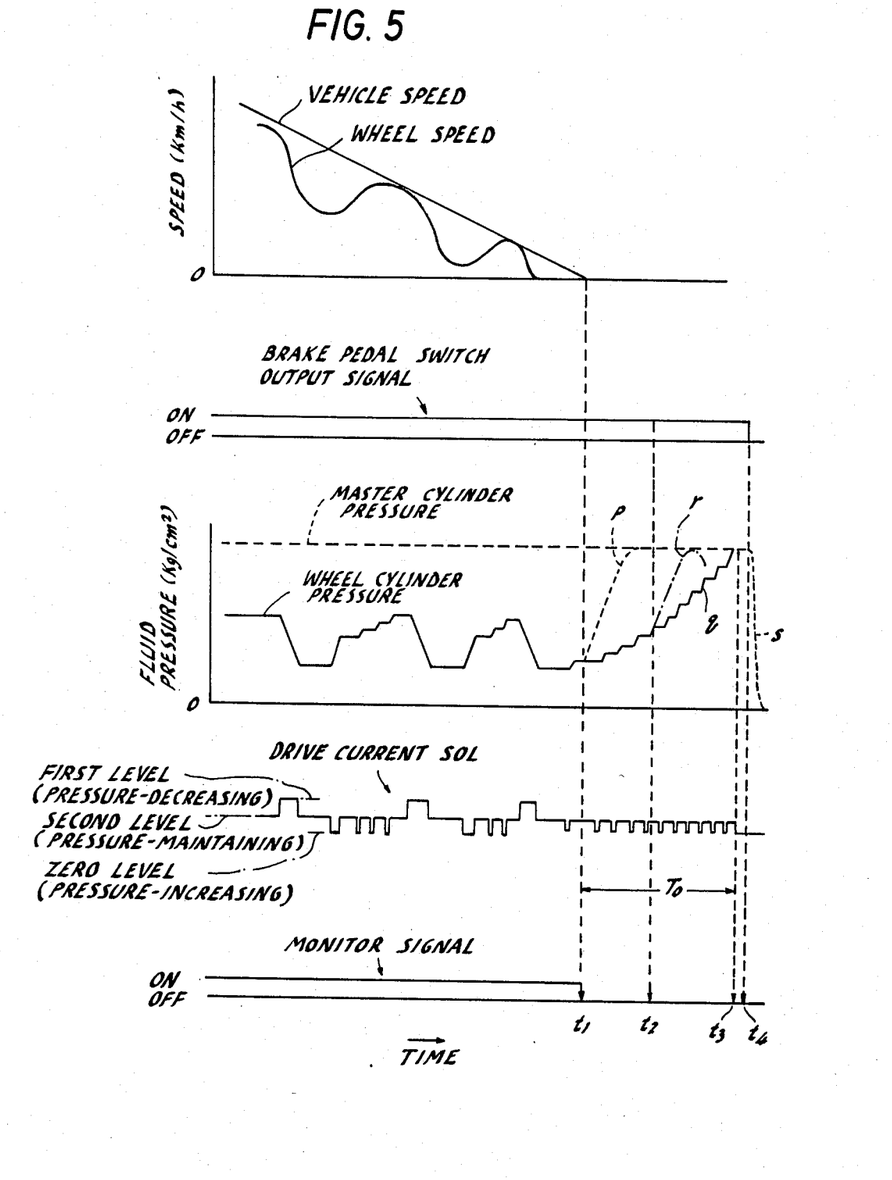
FIG. 5 is a chart showing various signals and fluid pressure in the anti-skid braking apparatus of FIG. 2.

The operation of the anti-skid braking apparatus according to the present invention will be further described with reference to a timing chart of FIG. 5. The timing chart of FIG. 5 shows a wheel speed, a vehicle speed which is obtained through calculation using the wheel speed, the state of the brake pedal switch 34, fluid pressure in the master cylinder 2 and in the wheel cylinders 6, 8 and 38, the level of the drive currents (SOL signal) fed from the control unit 28 to the solenoids 30, 32 and 54 of the fluid-pressure control valves 10, 12 and 40, and a monitor signal indicating that the vehicle speed is above zero.

The monitor signal is produced in the control unit 28 when the vehicle speed is above zero for indicating whether the vehicle is moving or stopping. More specifically, the wheel speed is sensed by the wheel speed sensors D1 to D3 so that wheel speed data is processed to derive the vehicle speed as described in the above, and the monitor signal is then produced by detecting the vehicle speed. In the presence of the monitor signal, namely before the vehicle stops, the drive currents SOL fed to the solenoids 30, 32 and 54 are arranged to assume the first level, second level and zero level respectively corresponding to pressure-decreasing mode, pressure-maintaining mode and pressure-increasing mode in accordance with the state of skid occuring during braking. As a result the pressure of the brake fluid in the wheel cylinders 6, 8 and 32 is controlled to be increased, decreased and maintained as shown so that the wheel speed is increased and decreased so that the deceleration of the wheel is within a range where an optimal slipping rate is achieved thereby providing safe and effective braking. In this way the vehicle is decelerated to be finally stopped when the brake pedal 4 is continuously depressed. When the vehicle stops, the monitor signal assumes low or OFF level. At this time let us assume that the brake pedal is still continuously depressed for a given period of time after the vehicle stops.

Under such state where the brake pedal is depressed although the vehicle is not moving, the drive currents SOL to the solenoids 30, 32 and 54 are controlled to assume the second level and the zero level alternately in accordance with the predetermined duty cycle of the pulse signal set in the step 106 of the flowchart of FIG. 4. Accordingly, the fluid-pressure control valves 10, 12 and 40 are repeatedly put in pressure-increasing mode and pressure-maintaining mode in accordance with the on/off operation according to the drive currents SOL.

Turning back to the conventional anti-skid braking apparatus described at the beginning of the specification, if the vehicle stops at time $t_1$ under the condition that the brake pedal 4 is being continuously depressed, the brake fluid stored in the reservoir is pressurized by the fluid-pressurizing pump and the accumulator so that fluid under pressure is supplied to the master cylinder at once. As a result the fluid pressure in the master cylinder suddenly increases from time $t_1$ as shown by a dotted curve "p" resulting in the occurrence of the kickback of the brake pedal. In the present invention, however, the fluid pressure in the wheel cylinders 6, 8 and 38 increases stepwise from time $t_1$ as shown by a solid curve "q" through the repetition of the pressure-increasing mode and the pressure-maintaining mode. As a result, an average slope of the pressure increase from the time $t_1$ of stopping of the vehicle is much gentler than that of the curve "p". This means the degree of kickback of the brake pedal can be reduced. The pressure increase slope may be further made gentle by increasing the time period of pressure-maintaining mode relative to the time period of the pressure-increasing mode. In other words, larger the duty cycle of the drive current (SOL signal), the gentler the fluid pressure increase slope, and therefore, it is possible to reduce the kickback to a negligibly small level.

A dot-dash curve "r" indicates the fluid pressure resulted when brake padal depression is stopped at time $t_2$ during the stepwise increase of the pressure through on/off control of the solenoids 30, 32 and 54. When the brake pedal 4 is released at time $t_2$, the solenoids 30, 32 and 54 are deenergized by the step 105 of the flowchart of FIG. 4 as described in the above, and thus the fluid pressure in the wheel cylinders 6, 8 and 38 rapidly increases along the curve "r". However, the state of pressure increase from time $t_1$ to time $t_2$ is the same as the curve "q", and therefore, there is no kickback. After the pressure within the wheel cylinders 6, 8 and 38 increases along the curve "r", the pressure in the master cylinder 2 lowers due to the operation of the reservoirs 2a and 2b associated with the master cylinder 2. This pressure decrease is not fully shown for simplicity.

Let us assume that the brake pedal 4 has continuously been depressed after time $t_1$ to time $t_4$ so that the fluid pressure in the wheel cylinders 6, 8 and 38 keeps increasing stepwise to reach the pressure of the fluid in the master cylinder 2 at time $t_3$. When the brake pedal 4 is released at time $t_4$, the pressure of the brake fluid in the wheel cylinders 6, 8 and 38 disappears as shown by a curve "s" due to the operation of the reservoirs 2a and 2b associated with the master cylinder 2. As a result brake shoe contacting state is removed to completely loosen the same.

In the above-described embodiment, although the drive currents or SOL signals fed to the solenoids 30, 32 and 54 have a predetermined duty cycle so that time ratio between the pressure-increasing mode and the pressure-maintaining mode is controlled, such control of the time ratio may be carried out by other method so that the time ratio can be freely set.

Furthermore, in the above-described embodiment, although the state of the brake pedal 4 is detected by the brake pedal switch 32, such detection may be unnecessary if it is arranged that the on/off control of the solenoids 30, 32 and 54 is performed whenever the vehicle speed lowers to zero.

In the above described embodiment, although the pressure-increasing mode is established intermittently such that the pressure-increasing mode and the pressure-maintaining mode alternately occur, such intermittent operation may also be achieved by arranging the control signal so that the pressure-increasing mode and the pressure-decreasing mode alternately occur.

From the forgoing description it will be understood that undesirable kickback of the brake pedal 4 is effectively prevented by gradually increasing the fluid pressure in the wheel cylinders 6, 8 and 38 when the brake pedal 4 is continuously depressed even after the vehicle stops.

The above-described embodiment is just an example of the present invention, and therefore, it will be apparent for those skilled in the art that many modifications and variations may be made without departing from the scope of the present invention.

What is claimed is:

1. An anti-skid braking appartus for a vehicle, comprising:
   (a) a fluid-pressure control valve arranged between a master cylinder and a wheel cylinder for selectively assuming at least a pressure-decreasing and a pressure-increasing mode for automatically controlling the pressure of fluid in the wheel cylinder in accordance with a control signal;
   (b) a reservoir communicating with said fluid-pressure control valve for discharging fluid in said wheel cylinder via said fluid-pressure control valve when said fluid-pressure control valve is in said pressure-decreasing mode;
   (c) a fluid-pressurizing pump communicating with said reservoir for feeding the fluid in said reservoir to a conduit communicating with said master cylinder and said fluid-pressure control valve;
   (d) a wheel speed detector for detecting the rotational speed of a wheel of said vehicle; and
   (e) a control unit responsive to an output signal from said wheel speed detector for producing said control signal fed to said fluid-pressure control valve for performing anti-skid braking, said control unit having first means for detecting when said vehicle is stopping, and second means for causing said fluid-pressure control valve to shift modes intermittently in response to the detection by said first means that said vehicle has stopped.

2. An anti-skid braking apparatus as claimed in claim 1, wherein said control valve further assumes a pressure-maintaining mode and said control unit is arranged to produce said control signal which assumes three levels repesenting said pressure-decreasing mode, said pressure-maintaining mode and said pressure-increasing mode respectively.

3. An anti-skid braking apparatus as claimed in claim 2, wherein said control unit is arranged to produce said control signal, after said vehicle stops, as a pulse signal having a duty cycle corresponding to the intermittently occurring pressure increasing mode.

4. An anti-skid braking apparatus as claimed in claim 2, wherein said control unit is arranged to produce said control signal, after said vehicle stops, which represnts said pressure increasing mode occurring intermittently at a given time interval.

5. An anti-skid braking apparatus as claimed in claim 2, wherein said control unit is arranged to produce said control signal, after said vehicle stops, which represnts said pressure-maintaining mode and said pressure increasing mode occurring alternately at a given time interval.

6. An anti-skid braking apparatus for a vehicle, of the type arranged to control a fluid-pressure control valve provided between a master cylinder and a wheel cylinder for assuming pressure-decreasing mode, pressure maintaining mode and pressure-increasing mode in accordance with a control signal produced on the basis of wheel speed data, said anti-skid braking apparatus comprising:
   (a) first means responsive to said wheel speed data for detecting whether said vehicle is moving or not; and
   (b) second means for producing an additional control signal, in response to the detection by said first means that said vehicle has stopped, for causing said fluid-pressure control valve to shift between said pressure increasing mode and at least one of said other modes intermittently.

7. An anti-skid braking apparatus as claimed in claim 6, wherein said first means comprises a computer responsive to said wheel speed data for approximating the speed of said vehicle.

8. An anti-skid braking apparatus as claimed in claim 6, wherein said second means comprises a computer for intermittently providing said pressure-increasing mode using a pulse signal having a predetermined period and width.

9. An anti-skid braking apparatus as claimed in claim 8, wherein said computer comprises a timer means for measuring a predetermined period of time within which said fluid-pressure control valve is put in said pressure-increasing mode intermittently.

10. An anti-skid braking apparatus as claimed in claim 6, further comprising means for detecting whether a brake pedal of said vehicle is depressed or not, said second means being arranged to cause said fluid-pressure control valve to assume said said pressure-increasing mode intermittently only when said brake pedal is being depressed.

11. An anti-skid braking apparatus as claimed in claim 6, wherein said second means is arranged to produce said additional control signal so that said pressure-increasing mode and said pressure-maintaining mode occur alternately.

* * * * *